(12) United States Patent
Ichinohe

(10) Patent No.: US 10,144,808 B2
(45) Date of Patent: Dec. 4, 2018

(54) BOTH-TERMINAL MODIFIED POLYSILOXANE MACROMONOMER AND A METHOD FOR PREPARING THE SAME

(71) Applicant: Shin-Etsu Chemical Co., Ltd., Tokyo (JP)

(72) Inventor: Shoji Ichinohe, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/689,643

(22) Filed: Aug. 29, 2017

(65) Prior Publication Data

US 2018/0057641 A1    Mar. 1, 2018

(30) Foreign Application Priority Data

Aug. 30, 2016 (JP) .................. 2016-168136

(51) Int. Cl.
| | | |
|---|---|---|
| *C08G 77/388* | (2006.01) | |
| *G02B 1/04* | (2006.01) | |
| *C08G 77/46* | (2006.01) | |
| *C08G 77/458* | (2006.01) | |

(52) U.S. Cl.
CPC ........... *C08G 77/388* (2013.01); *C08G 77/46* (2013.01); *G02B 1/041* (2013.01); *C08G 77/458* (2013.01); *G02B 1/043* (2013.01)

(58) Field of Classification Search
None
See application file for complete search history.

(56) References Cited

U.S. PATENT DOCUMENTS

| | | |
|---|---|---|
| 2002/0016383 A1 | 2/2002 | Iwata et al. |
| 2009/0234089 A1 | 9/2009 | Ueyama et al. |
| 2016/0272766 A1 | 9/2016 | Satake et al. |
| 2016/0289368 A1 | 10/2016 | Satake |

FOREIGN PATENT DOCUMENTS

| | | | | |
|---|---|---|---|---|
| CA | 2394939 A1 * | 6/2001 | ....... | B29D 11/00125 |
| JP | 6-32855 A | 2/1994 | | |
| JP | 3441024 B2 | 8/2003 | | |
| JP | 2010-138255 A | 6/2010 | | |
| WO | WO 01/44861 A1 | 6/2001 | | |
| WO | WO 2009/099164 A1 | 8/2009 | | |
| WO | WO 2015/092858 A1 | 6/2015 | | |
| WO | WO 2015/092859 A1 | 6/2015 | | |

OTHER PUBLICATIONS

Extended European Search Report for European Application No. 17188327.5, dated Jan. 23, 2018.

* cited by examiner

*Primary Examiner* — Clinton A Brooks
*Assistant Examiner* — Kofi Adzamli
(74) *Attorney, Agent, or Firm* — Birch, Stewart, Kolasch & Birch, LLP

(57) ABSTRACT

One of the purposes of the present invention is to provide a polysiloxane macromonomer which has high hydrophilicity and a narrow molecular weight distribution and is usable as a material for ophthalmic lenses. The present invention provides a method for preparing a both-terminal modified polysiloxane macromonomer represented by the following average structural formula [I]:

$$RMe_2SiO(Me_2SiO)_pSiMe_2R \qquad [I]$$

wherein R represents $-C_3H_6O(C_2H_4O)_qC(=O)NH(C_2H_4O)_sC(=O)C(Q)=CH_2$, Me is a methyl group, p is an integer of from 40 to 100, q is an integer of from 5 to 10, s is an integer of from 1 to 3 and Q is a methyl group or a hydrogen atom, wherein the method comprises steps of
(a) reacting a polysiloxane which has polyoxyethylenes at both terminals and is represented by the following average structural formula [II]:

$$R''Me_2SiO(Me_2SiO)_pSiMe_2R'' \qquad [II]$$

wherein R'' represents $-C_3H_6O(C_2H_4O)_qH$ and Me, p and q are as defined above,
with a compound represented by the following general formula [III]:

$$OCN(C_2H_4O)_sC(=O)C(Q)=CH_2 \qquad [III]$$

wherein Q and s are as defined above,
in the presence of a catalyst,
(b) subjecting the mixture obtained in step (a) to liquid-liquid extraction by hexane and acetonitrile, and
(c) removing hexane from a hexane phase to obtain the both-terminal modified polysiloxane macromonomer represented by the average structural formula [I].

Further, the present invention provides a both-terminal modified polysiloxane macromonomer prepared according to the aforesaid method.

5 Claims, 4 Drawing Sheets

BOTH-TERMINAL MODIFIED POLYSILOXANE MACROMONOMER AND A METHOD FOR PREPARING THE SAME

CROSS REFERENCE

This application claims the benefits of Japanese Patent Application No. 2016-168136 filed on Aug. 30, 2016, the contents of which are hereby incorporated by reference.

FIELD OF THE INVENTION

The present invention relates to a both-terminal modified polysiloxane macromonomer which is copolymerizable with another hydrophilic monomer to provide a polymer suitable for ophthalmic lenses such as contact lenses, intraocular lenses and artificial corneas, and a method for preparing the macromonomer.

A polysiloxane which has polyoxyethylene group-having hydrophilic groups at both terminals are known as a polysiloxane macromonomer for ophthalmic lenses. For instance, Japanese Patent No. 3441024, patent literature 1, describes a compound represented by the formula: $R^1Me_2SiO(Me_2SiO)_a(CF_3C_2H_4MeSiO)_b(R^2MeSiO)_cSiMe_2R^1$, wherein $R^1$ represents $-C_3H_6OC_2H_4OC(=O)NHC_2H_4OC(=O)C(Me)=CH_2$, $R^2$ is $-C_3H_6O(C_2H_4O)_dMe$, Me is a methyl group, a/(b+c) is 1/10 to 100/1, b/c is 1/10 to 10/1, a+b+c is 10 to 1000, and d is 1 to 200.

WO09/099164, patent literature 2, describes a compound represented by the formula: $CH_2=C(Me)C(=O)OC_3H_6Me_2SiO(Me_2SiO)_e(R^3MeSiO)_fSiMe_2C_3H_6OC(=O)C(Me)=CH_2$, wherein $R^3$ represents $-C_3H_6O(C_2H_4O)_gMe$, e and f are an integer of one or more, e+f is 20 to 500, and g is an integer of from 4 to 100.

Japanese Patent Application Laid-Open No. Hei 6-32855, patent literature 3, describes a compound represented by the formula: $R^4Me_2SiO(Me_2SiO)_hSiMe_2R^4$, wherein $R^4$ represents $-C_3H_6O(C_2H_4O)_iC(=O)C(Me)=CH_2$, h is an integer of from 1 to 700 and i is an integer of from 1 to 20.

WO01/044861, patent literature 4, describes a compound represented by the formula: $X^1Me_2SiO-[Y^1]-SiMe_2-X^1$, wherein $X^1$ represents $CH_2=C(Me)C(=O)OC_2H_4-NHCOO-(C_2H_4O)_q-(CH_2)_n-$ is an integer of from 3 to 10, q is an integer of from 0 to 20 and $[Y^1]$ is polysiloxane skeleton having two or more siloxane units.

Japanese Patent Application Laid-Open No. 2010-138255, patent literature 5, describes a compound represented by the formula: $R^5Me_2SiO(Me_2SiO)_jSiMe_2R^5$, wherein $R^5$ represents $-C_3H_6O(C_2H_4O)_kC(=O)NHC_2H_4OC(=O)C(Me)=CH_2$, j is an integer of from 5 to 150 and k is an integer of from 2 to 21. This compound is used for hard coating materials.

It is known that when a polysiloxane macromonomer is used for ophthalmic lenses such as contact lenses and intraocular lenses, a macromonomer having a narrower molecular weight distribution, Mw/Mn, provides a lens having a smaller variation in properties.

Polysiloxane macromonomers having hydrophilic groups at the both terminals are generally prepared by reacting a polysiloxane having polyoxyethylene groups at the both terminals with a compound having a (meth)acryl group at one terminal. If a polyoxyethylene group is present in a side chain and, also, at the terminals, it is difficult to control the number of the side chain and, therefore, the molecular weight distribution becomes larger. It is preferred that the chain length of the polyoxyethylene group at the terminals is longer to give higher hydrophilicity. However, when the chain length of the polyoxyethylene group at the terminals is longer, the molecular weight distribution is larger.

The compounds described in patent literatures 1 and 2 have polyoxyethylene groups as side chains and, therefore, they have a large molecular weight distribution.

The compounds described in patent literatures 3 to 5 have a polyoxyethylene group only at the terminals. None of these patent literatures describes a molecular weight distribution. The compound described in patent literature 3 has no urethane group and, therefore, its curability is poor.

Patent literature 4 describes that the target compound is purified by washing with a hydrophilic medium such as water and methanol. However, patent literature 4 describes the purification of the aforesaid polysiloxane wherein q is only 1 in the aforesaid formula. This polysiloxane has a short chain of the polyoxyethylene at the both terminals. Therefore, the hydrophilicity of the polysiloxane is poor and, therefore, the polysiloxane is less copolymerizable with another hydrophilic monomer. Patent literature 5 describes the preparation of the polysiloxane wherein j is 9 and k is 8 in the aforesaid formula.

Purification is not carried out in patent literature 5.

PRIOR LITERATURES

Patent Literature 1: Japanese Patent No. 3441024
Patent Literature 2: WO09/099164
Patent Literature 3: Japanese Patent Application Laid-Open No. Hei 6-32855
Patent Literature 4: WO01/044861
Patent Literature 5: Japanese Patent Application Laid-Open No. 2010-138255

SUMMARY OF THE INVENTION

One of the purposes of the present invention is to provide a polysiloxane macromonomer which has high hydrophilicity and a narrow molecular weight distribution and is usable as a material for ophthalmic lenses.

As stated above, a polysiloxane macromonomer having short chain length-having polyoxyethylene groups at both terminals can be prepared via a purification by washing with a hydrophilic medium such as water and methanol. However, because the chain length of the polyoxyethylene group is short in such a macromonomer, its hydrophilicity is unsatisfactory. In contract, if a chain length of the polyoxyethylene is made longer to increase the hydrophilicity of the macromonomer, a surface-active function becomes stronger. Therefore, when such a polysiloxane macromonomer is subjected to purification by washing with a hydrophilic medium such as water and methanol, foaming occurs so that a desired macromonomer is not separated or refined.

The present inventors have made research and found that the specific polysiloxane macromonomer having long chain polyoxyethylene groups at both terminals is separated and refined by liquid-liquid extraction using hexane and acetonitrile. Specifically, a polysiloxane having polyoxyethylene groups only at the terminals is used as a starting material to be reacted and a reaction product obtained is subjected to the liquid-liquid extraction by hexane and acetonitrile, whereby a polysiloxane macromonomer having a high hydrophilicity and a narrow molecular weight distribution is obtained.

Thus, the present invention provides a method for preparing a both-terminal modified polysiloxane macromonomer represented by the following average structural formula [I]:

$$RMe_2SiO(Me_2SiO)_pSiMe_2R \qquad [I]$$

wherein R represents —C$_3$H$_6$O(C$_2$H$_4$O)$_q$C(=O)NH(C$_2$H$_4$O)$_s$C(=O)C(Q)=CH$_2$, Me is a methyl group, p is an integer of from 40 to 100, q is an integer of from 5 to 10, s is an integer of from 1 to 3 and Q is a methyl group or a hydrogen atom, wherein the method comprises steps of (a) reacting a polysiloxane which has polyoxyethylenes at both terminals and is represented by the following average structural formula [II]:

R"Me$_2$SiO(Me$_2$SiO)$_p$SiMe$_2$R"  [II]

wherein R" represents —C$_3$H$_6$O(C$_2$H$_4$O)$_q$H and Me, p and q are as defined above,
with a compound represented by the following general formula [III]:

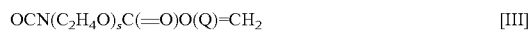

OCN(C$_2$H$_4$O)$_s$C(=O)O(Q)=CH$_2$  [III]

wherein Q and s are as defined above,
in the presence of a catalyst, (b) subjecting the mixture obtained in step (a) to liquid-liquid extraction by hexane and acetonitrile, and (c) removing hexane from a hexane phase to obtain the both-terminal modified polysiloxane macromonomer represented by the average structural formula [I].

Further, the present invention provides a both-terminal modified polysiloxane macromonomer prepared according to the aforesaid method.

EFFECTS OF THE INVENTION

According to the present method, a both-terminal modified polysiloxane macromonomer having high hydrophilicity and a narrow molecular weight distribution is provided. The both-terminal modified polysiloxane macromonomer is useful as a material for ophthalmic devices.

DETAILED DESCRIPTION OF THE INVENTION

Figure 1:
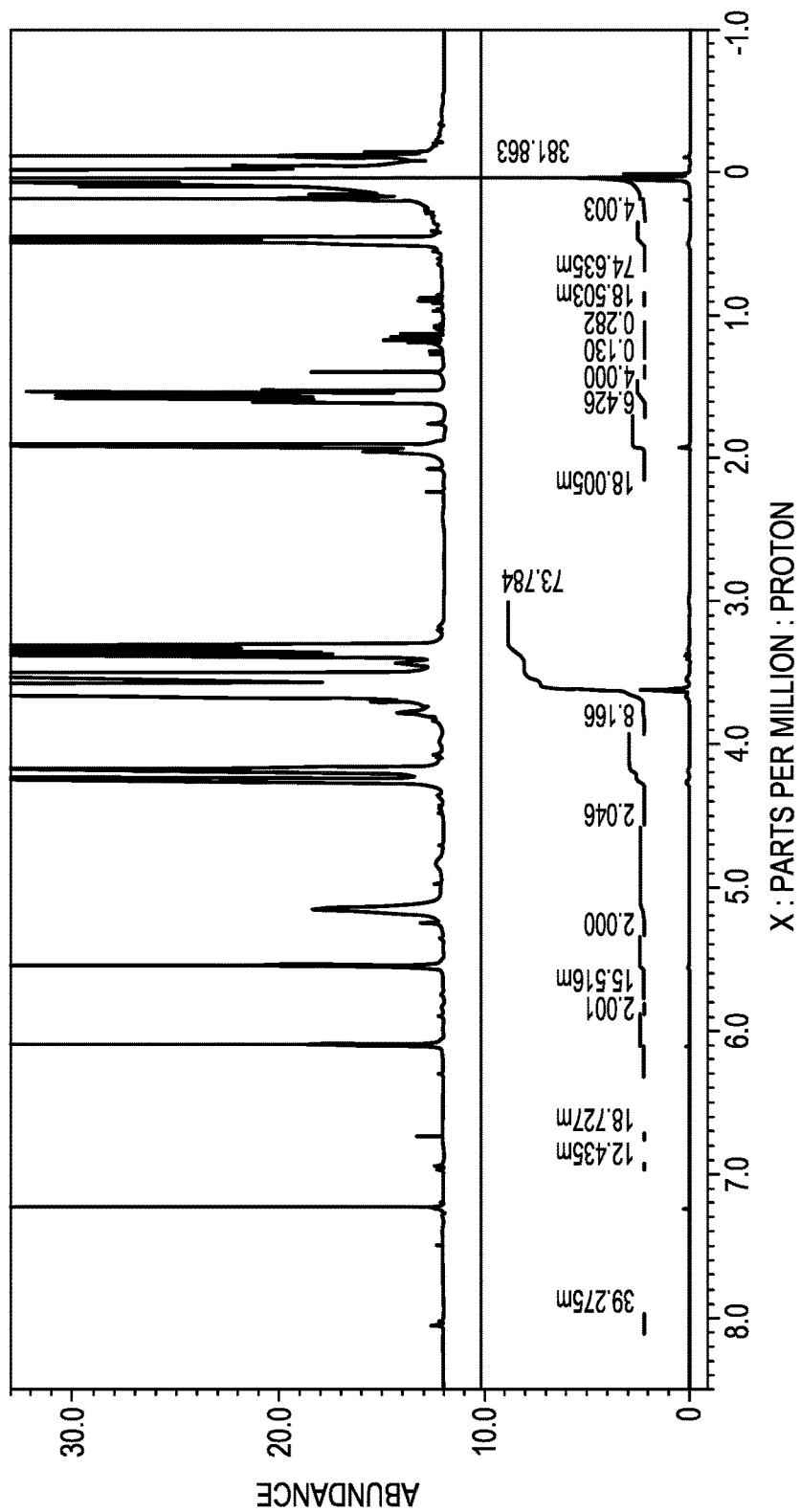
FIG. 1 is a chart of $^1$H-NMR spectra of the both-terminal modified polysiloxane macromonomer prepared in Example 1.
Figure 2:
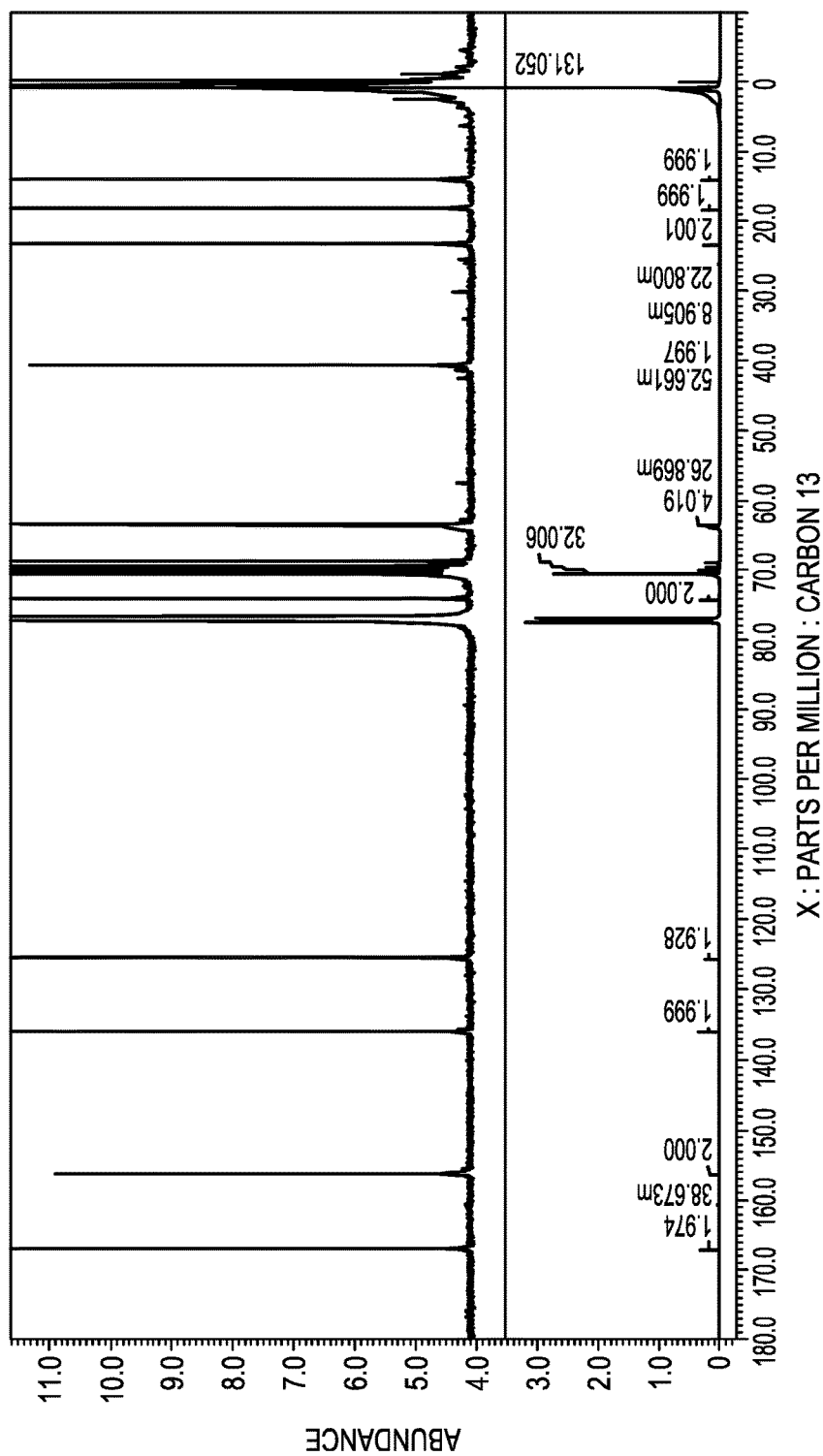
FIG. 2 is a chart of $^{12}$C-NMR spectra of the both-terminal modified polysiloxane macromonomer prepared in Example 1.
Figure 3:
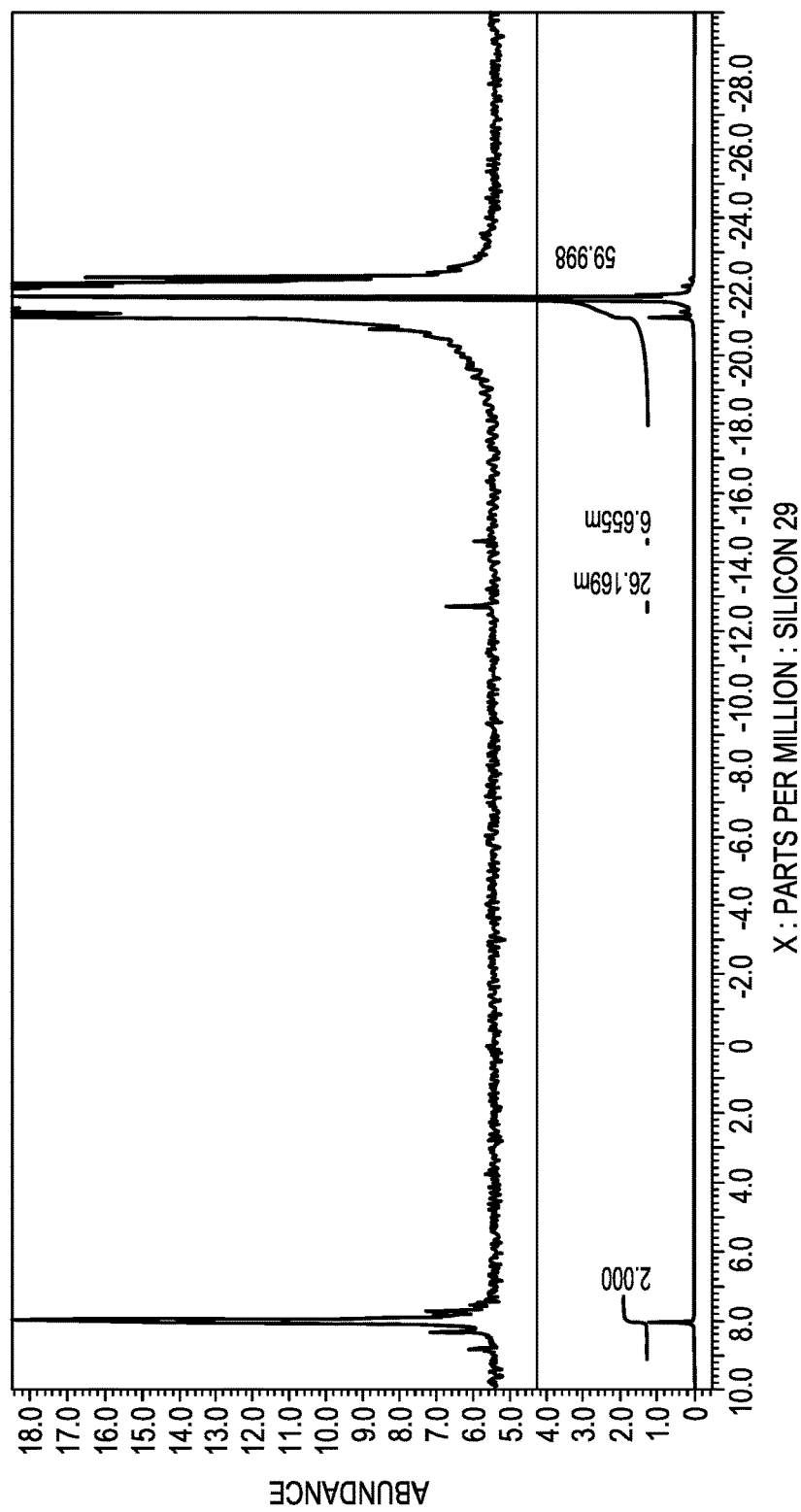
FIG. 3 is a chart of $^{29}$Si-NMR spectra of the both-terminal modified polysiloxane macromonomer prepared in Example 1.

The present preparation method will be described below in detail.
The present method comprises steps of (a) reacting the compound represented by the formula [II] with a compound represented by the formula [III] in the presence of a catalyst, that is an urethane formation reaction, (b) subjecting the mixture obtained in step (a) to liquid-liquid extraction by hexane and acetonitrile, and (c) removing hexane from a hexane phase to obtain the both-terminal modified polysiloxane macromonomer represented by the formula [I]. The compound represented by the formula [I] has high hydrophilicity. However, on account of p and q in the specific range, the compound represented by the formula [I] transfers into the hexane phase. The compound represented by the formula [I] obtained by removing hexane from the hexane phase has a narrow molecular weight distribution, Mw/Mn, preferably of 1.3 or less, particularly 1.2 or less. Therefore, according to the present method, the both-terminal modified polysiloxane macromonomer which has high hydrophilicity and a narrow molecular weight distribution is provided. The molecular weights, Mn and Mw, reduced to polystyrene are determined by a gel permeation chromatography (GPO) with tetrahydrofuran (THF) to calculate the molecular weight distribution.

One of the starting compounds used in the present method is a polysiloxane which has polyoxyethylene groups only at both terminals and is represented by the following average structural formula [II]:

R"Me$_2$SiO(Me$_2$SiO)$_p$SiMe$_2$R"  [II]

wherein Me is a methyl group and R' represents —C$_3$H$_6$O(C$_2$H$_4$O)$_q$H. On account of the fact that the compound has the polyoxyethylene group only at the both terminals, the macromonomer obtained has a narrow molecular weight distribution. In a case where the polyoxyethylene group is present as a side chain in addition to the terminals, it is difficult to control the number of the side chain and, therefore, the macromonomer obtained has a larger molecular weight distribution.

In the formula [II], p is an integer of from 40 to 100, preferably 50 to 80. If p is larger than the aforesaid upper limit, a macromonomer obtained becomes more hydrophobic and, therefore, copolymerization of the macromonomer with another hydrophilic monomer will proceed poorly. If p is smaller than the aforesaid lower limit, the copolymerization of the macromonomer with the other hydrophilic monomer proceeds well, but the crosslinking density in the copolymer obtained is high and, therefore, a cured product has poor flexibility. Further, a macromonomer represented by the formula [I] is poorly extracted in a hexane phase in the liquid-liquid extraction by hexane and acetonitrile. q is an integer of from 5 to 10, preferably 6 to 8. If q is smaller than the aforesaid lower limit, a macromonomer obtained has less hydrophilicity and, therefore, the copolymerization of a macromonomer with another hydrophilic monomer will proceed poorly. If q is larger than the aforesaid upper limit, the copolymerization of a macromonomer with another hydrophilic monomer proceeds well, but weigh percentage of the siloxane units in the macromonomer [I] is small and, therefore, an oxygen permeability of the copolymer becomes low. Further, a macromonomer represented by the formula [I] is poorly extracted in the hexane phase in the liquid-liquid extraction by hexane and acetonitrile.

Another starting compound used in the present method is a compound which has a (meth)acryl group and an isocyanate group and is represented by the general formula [III]:

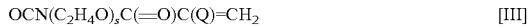

OCN(C$_2$H$_4$O)$_s$C(=O)C(Q)=CH$_2$  [III]

wherein Q is a methyl group or a hydrogen atom and s is an integer of from 1 to 3.

If the aforesaid compound [III] has no isocyanate group, the monomer obtained has no urethane group and, therefore, the curability of the monomer is poor. Preferred is that s is 2 or 3, particularly s is 2. Q is preferably a methyl group.

The urethane formation reaction in step (a) may be conducted according to any known manners. For instance, the compound represented by the formula [II] reacts with the compound represented by the formula [III] in the presence of a catalyst for urethane formation preferably at 20 to 100 degrees C., more preferably 40 to 80 degrees C., preferably for 10 minutes to 24 hours, more preferably 1 to 10 hours. The compound represented by the formula [III] is generally used in an amount of 1 to 3 moles per mole of a hydroxyl group in the compound represented by the formula [II]. A polymerization inhibitor may be added in the reaction. Examples of the polymerization inhibitor include bis-t-butylhydroxytoluene(BHT) and p-methoxyphenol (MQ). One of more polymerization inhibitors may be used. The amount of the polymerization inhibitor is preferably 0.001 to 0.5 part by weight, relative to a total 100 parts by weight of the compounds represented by the formulas [II] and [III].

Any conventional catalyst for urethane formation may be used. For instance, organic iron compounds and amine compounds are preferably used. An example of the organic iron compounds include iron(III) acetylacetonate. Examples of the amine compounds include cyclic tertiary amines such as triethylenediamine; aliphatic tertiary amines such as trimethylamine and triethylamine; and aromatic tertiary amines such as dimethylaniline and triphenylamine. Among these, organic iron compounds, particularly iron(III) acetylacetonate, are preferable.

The amount of the catalyst may be decided as long as the urethane formation reaction is sufficiently accelerated, that is, it may be a catalytic amount, but is not limited. Generally, the amount of the catalyst is 1 ppm or more, preferably 30 ppm or more, relative to a total mass of the polysiloxane which has polyoxyethylenes groups at both terminals and is represented by the formula [II] and the isocyanate compound represented by the formula [III]. The upper limit is preferably 10,000 ppm or less, further preferably 3,000 ppm or less, in view of decreasing the amount of the remaining catalyst after the reaction.

The number of repetitions of the liquid-liquid extraction in step (b) is not limited, but usually 2 times are sufficient. If needed, the liquid-liquid extraction may be repeated five times. Each mass of hexane and acetonitrile is one to three times as much as the mass of the reaction mixture to be subjected to the liquid-liquid extraction. A mass ratio of hexane to acetonitrile in the step (b) is preferably 1:3 to 3:1, further preferably 1:2 to 2:1.

The compound represented by the formula [I] has high hydrophilicity. However, on account of p and q in the specific ranges, the compound [I] transfers into the hexane phase in the liquid-liquid extraction in step (b). In contrast, the compound whose p is smaller than the aforesaid lower limit and/or q is larger than the aforesaid upper limit has high hydrophilicity, does not transfer into the hexane phase, and transfers into the acetonitrile phase. In particular, when the compound has a short siloxane chain, that is, p is smaller than the aforesaid lower limit in the formula [I], the compound transfers into the acetonitrile phase and can be removed. Accordingly, even if the reaction mixture to be subjected to the extraction in step (b) contains such a compound, this compound does not transfer into the hexane phase and, therefore, the compound obtained in step (c) has the narrow molecular weight distribution. For instance, if the starting polysiloxane [II] has a wide molecular weight distribution, Mw/Mn, of more than 1.3, the polysiloxane [I] obtained has a narrow molecular weight distribution.

The manner of preparing the polysiloxane which has polyoxyethylene groups at both terminals and is represented by the formula [II] is not limited. For instance, it is prepared by addition-reacting a polyoxyethylene monoallylether represented by the following average structure [V] with a polysiloxane having hydrogen atoms at both terminals, which is represented by the following average structure [IV], in the presence of a platinum catalyst. The amount of the polyoxyethylene monoallylether is 2 moles or more, preferably 2.3 to 2.5 moles, per mole of the hydrogen polysiloxane.

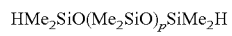

$$HMe_2SiO(Me_2SiO)_pSiMe_2H \quad [IV]$$

$$CH_2=CHCH_2(C_2H_4O)_qH \quad [V]$$

wherein p is an integer of from 40 to 100 and q is an integer of from 5 to 10.

The aforesaid addition reaction ends usually in a few hours at 60 to 100 degrees C. The reaction is usually conducted with a solvent, but can proceeds without any solvent. The solvent may be selected properly and is preferably hydrocarbons such as toluene and hexane, and alcohols such as ethanol and isopropyl alcohol. Among these, isopropyl alcohol is further preferably. The platinum catalyst includes platinum, platinum black and chloroplatinic acid, such as $H_2PtCl_6 \cdot mH_2O$, $K_2PtCl_6$, $KHPtCl_6 \cdot mH_2O$, $K_2PtCl_4$, $K_2PtCl_4 \cdot mH_2O$ and $PtO_2 \cdot mH_2O$, wherein m is a positive integer, and a complex of these with a hydrocarbon such as an olefin, an alcohol, or an organopolysiloxane having a vinyl group. These may be used alone or in a combination of two or more of them.

After the reaction, the solvent is stripped off with heating under a reduced pressure to obtain a mixture of the compound represented by the formula [II] and the unreacted compound represented by the formula [V].

The mixture is subjected to the liquid-liquid extraction by hexane and acetonitrile so as to allow the compound [II] to transfer into the hexane phase. In this extraction, the unreacted polyoxyethylene monoallyether [V] and the compound whose p is smaller than the aforesaid lower limit and/or q is larger than the aforesaid upper limit in formula [II] have higher hydrophilicity and do not transfer into the hexane phase. Therefore, these compounds transfer into the acetonitrile phase and, therefore, the compound with a narrow molecular weight distribution [II] is contained in the hexane phase. Then, hexane is removed from the hexane phase to isolate the compound [II]. The number of repetitions of the liquid-liquid extraction is not limited, but is usually two times are enough. If needed, the liquid-liquid extraction may be conducted five times. The each mass of hexane and acetonitrile is preferably 1 to 3 times as much as the mass of the mixture to be subjected to the liquid-liquid extraction. The compound [II] isolated is reacted with the compound [III].

Alternatively, the addition-reaction mixture obtained in the aforesaid preparation of the compound [II] may be reacted with the compound [III] without isolating the compound [II]. Then, the product obtained is subjected to the liquid-liquid extraction several times and, then, the hexane is removed from the hexane phase to obtain the compound [I]. This method is more preferred because the compound [I] is prepared via fewer steps.

The both-terminal modified polysiloxane macromonomer [I] may be copolymerized with another hydrophilic monomer to provide a polymer suitable for ophthalmic devices. Examples of the hydrophilic monomer include hydroxyl group-having monomers such as 2-hydroxyethyl methacrylate, 2-hydroxypropyl methacrylate, 2-hydroxybutyl acrylate, 4-hydroxybutyl acrylate, and glycerol methacrylate; carboxylic group-having monomers such as methacrylic acid, acrylic acid, itaconic acid, fumaric acid and maleic acid; amino group-having monomers which are substituted with an alkyl group, such as dimethylaminoethyl methacrylate and diethylaminoethyl methacrylate; amide group-having monomers such as N, N-dimethyl acrylamide, N, N-diethyl acrylamide, N-methylacrylamide, methylenebisacrylamide, diacetone acrylamide, N-vinyl pyrrolidone and N-vinyl-N-methylacetoamide; and oxyalkylene group-having monomers such as methoxypolyethyleneglycol monomethacrylate and polypropyleneglycol monoacrylate.

Further, a hydrophobic monomer which can copolymerize with the present macromonomer may be used in addition to the aforesaid hydrophilic monomer. Examples of the hydrophobic monomer include fluorine containing monomers such as (meth)acrylic acid fluoroalkylester, for instance trifluoroethyl(meth)acrylate, tetrafluoroethyl(meth)acrylate, tetrafluoropropyl(meth)acrylate, pentafluoropropyl(meth)acrylate, hexafluorobutyl(meth)acrylate and hexafluoroisopropyl(meth)acrylate. These may be selected depending on desired compatibility, hydrophilicity, moisture content and dust resistance of the polymer. Further, a silicone monomer such as tris(trimethylsiloxy)silylpropyl methacrylate may be used in order to improve the oxygen permeability.

Particularly, the present invention provides a both-terminal modified polysiloxane macromonomer represented by the following average structural formula [I']:

wherein R' represents —$C_3H_6O(C_2H_4O)_qC(=O)NH(C_2H_4O)_rC(=O)C(Q)=CH_2$, Me is a methyl group, p is an integer of from 40 to 100, preferably an integer of from 50 to 80, q is an integer of from 5 to 10, preferably an integer of from 6 to 8, r is an integer of from 2 to 3 and Q is a methyl group or a hydrogen atom. Particularly, the both-terminal modified polysiloxane macromonomer represented by the formula [I'] and having a molecular weight distribution, Mw/Mn, of 1.3 or less is provided.

The macromonomer represented by the aforesaid formula [I'] can be prepared according to the present method described above. The both-terminal modified polysiloxane macromonomer is copolymerized with another hydrophilic monomer, optionally further with a hydrophobic monomer, to provide a polymer suitable for ophthalmic lenses.

EXAMPLES

The present invention will be explained below in further detail with reference to a series of the Examples and the Comparative Examples, though the present invention is in no way limited by these Examples.

In the following descriptions, the molecular weights reduced to polystyrene were determined by GPC analysis according to the following conditions to calculate the molecular weight distribution.

[GPC Conditions]
Apparatus: HLC-8120GPC, ex TOSOH Cop.
Columns: TSKgel Super HM-N, H2500 equipped with a guard column, ex TOSOH Cop.
Detector: RI detector or UV detector
Eluent: Tetrahydrofuran
Flow rate: 0.6 mL/min.
Column Temperature: 40 degrees C.
Injection Volume: 10 micro liters
Concentration of the sample: 0.02 g/10 mL
In the following descriptions, NMR determination was conducted with JNM-ECP500, ex JEOL Ltd. and a solvent was $CDCl_3$.

Synthesis Example 1

Synthesis of a polysiloxane having polyoxyethylene residues at the both terminals [II]-1

To a two-liter flask, added were 309.4 g (0.1 mol) of a polysiloxane having hydrogen atoms at both terminals, represented by the average structural formula: $HMe_2SiO(Me_2SiO)_{40}SiMe_2H$, 102.5 g (0.25 mol) of polyoxyethylene monoallyl ether represented by the following average structural formula [V]-1, 400 g of isopropyl alcohol as a solvent, and 0.08 g of a solution of a complex of chloroplatinic acid with tetramethyldivinyl disiloxane in ethanol, containing 3 weight % of platinum, and reacted under a reflux of isopropyl alcohol at an inner temperature of 84 degrees C. for 5 hours. The isopropyl alcohol was removed under a reduced pressure to obtain a pale-brown, transparent liquid. This was a mixture of 0.1 mole of a polysiloxane which has polyoxyethylenes at both terminals and is represented by the following average structural formula [II]-1 and 0.05 mole of the unreacted compound represented by the formula [V]-1. The molecular weight distribution, Mw/Mn, of the polysiloxane [II]-1 was 1.42, as determined by GPC analysis.

wherein R" is —$C_3H_6O(C_2H_4O)_8H$

Example 1

Synthesis of Both Terminal-Modified Polysiloxane Macromonomer [I]-1

To a 500-milliliter flask, added were 173.9 g of the mixture obtained in Synthesis Example 1 which contained 0.1 mole of a hydroxyl group, 0.12 g of bis-t-butylhydroxytoluene or BHT, 0.48 g of p-methoxyphenol or MQ, and 0.048 g of iron(III)acetylacetonate, and stirred for one hour to thereby dissolve the iron catalyst in the aforesaid mixture. Then, 39.8 g (0.2 mol) of $OCN(C_2H_4O)_2C(=O)C(Me)=CH_2$, Karenz MOI-EG, ex SHOWA DENKO Co., was added dropwise from a dropping funnel to the mixture at an inner temperature of 25 degrees C. Subsequently, the mixture was maintained at 40 degrees C. for 3 hours, to which 19.2 g of methanol was then added to thereby stop the reaction. The reaction liquid was dissolved in 500 g of hexane, to which 500 g of acetonitrile was then added and liquid-liquid extraction was conducted. After removing the lower acetonitrile phase, another 500 g of acetonitrile was added. This liquid-liquid extraction was repeated further four times. Finally, hexane was stripped off from the hexane phase under a reduced pressure to obtain a pale-yellow, transparent, viscous liquid. The product obtained was analyzed by $^1$H-NMR, $^{13}$C-NMR and $^{29}$Si-NMR and found to be a polysiloxane represented by the following average structural formula [I]-1. The molecular weight distribution, Mw/Mn, of polysiloxane [I]-1 was 1.16, as determined by GPC analysis. The average molecular chain length of polysiloxane [I]-1 was longer than that of polysiloxane [II]-1 which was a starting compound, as seen in the following formula [I]-1. This is because the compounds having a shorter chain length moved into the acetonitrile phase and removed and, therefore, the molecular weight distribution of the purified polysiloxane became narrower.

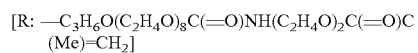

$^1$H-NMR, $^{13}$C-NMR and $^{29}$Si-NMR spectra and a GPC chart are as shown in FIGS. 1 to 4.

$^1$H-NMR analysis was conducted with the sample concentration of 10% and the cumulative number of 64 times.

$^{13}$C-NMR analysis was conducted with the sample concentration of 40% and the cumulative number of 2400 times.

$^{29}$Si-NMR analysis was conducted with the sample concentration of 10% and the cumulative number of 2400 times.

Figure 4:
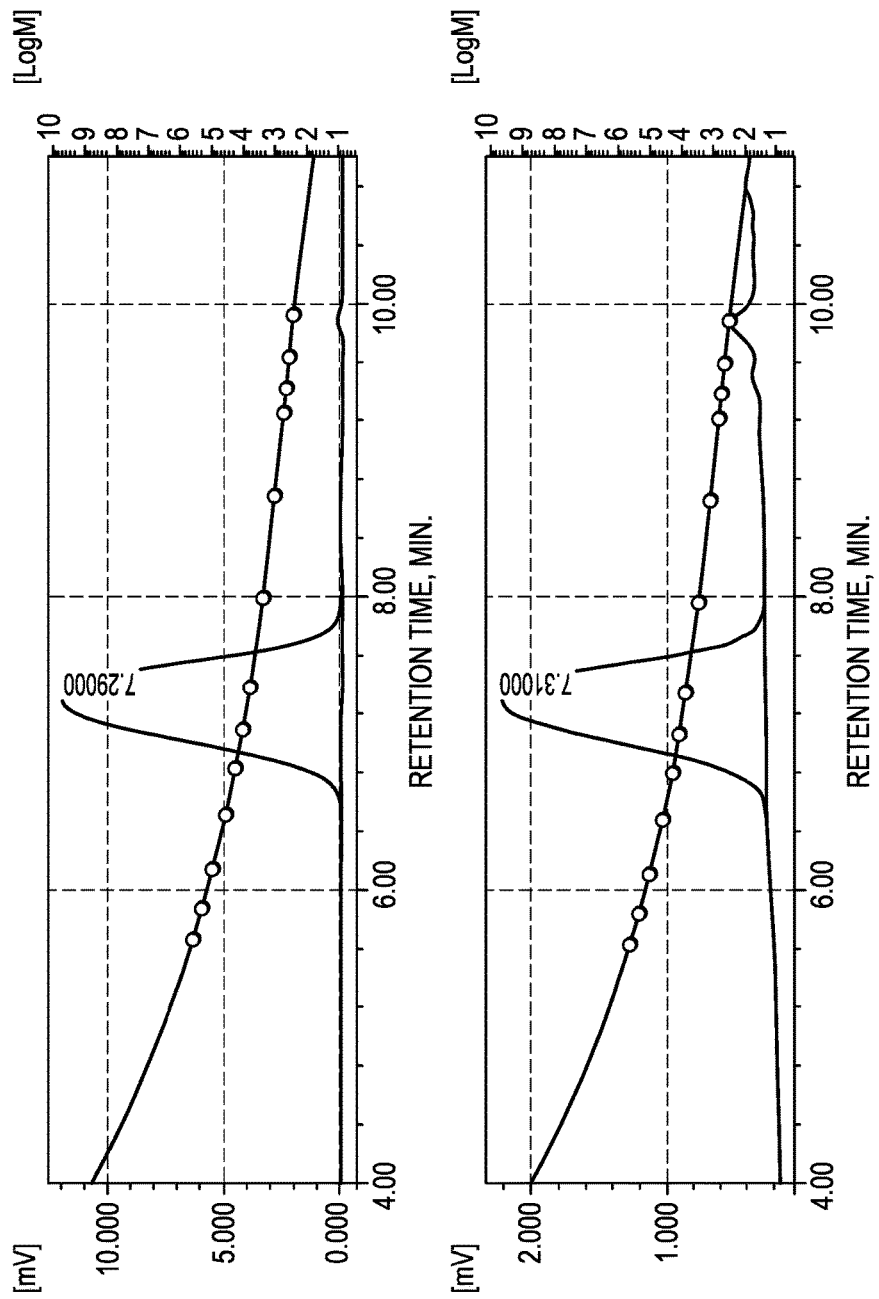
FIG. 4 is a GPC chart of the both-terminal modified polysiloxane macromonomer prepared in Example 1.

In FIG. 4, the upper graph is a GPC chart obtained by the IR detection and the lower graph is a GPC chart obtained by the UV detection.

Example 2

Synthesis of Both Terminal-Modified Polysiloxane Macromonomer [I]-2

To a 500-milliliter flask, added were 173.9 g of the mixture obtained in Synthesis Example 1 which contained 0.1 mole of hydroxyl group, 0.12 g of bis-t-butylhydroxytoluene or BHT, 0.48 g of p-methoxyphenol or MQ, and 0.048 g of iron(III)acetylacetonate, and stirred for one hour to thereby dissolve the iron catalyst in the aforesaid mixture. Then, 31.0 g (0.2 mol) of OCN(C$_2$H$_4$O)C(=O)C(Me)=CH$_2$, Karenz MOI, ex SHOWA DENKO Co., was added dropwise from a dropping funnel to the mixture at an inner temperature of 25 degrees C. Subsequently, the mixture was maintained at 40 degrees C. for 3 hours, to which 19.2 g of methanol was then added to thereby stop the reaction. The reaction liquid was dissolved in 500 g of hexane, to which 500 g of acetonitrile was then added and liquid-liquid extraction was conducted. After removing the lower acetonitrile phase, another 500 g of acetonitrile was added. This liquid-liquid extraction was repeated further four times. Finally, hexane was stripped off from the hexane phase under a reduced pressure to obtain a pale-yellow, transparent, viscous liquid. The product obtained was analyzed by $^1$H-NMR, $^{13}$C-NMR and $^{29}$Si-NMR and found to be a polysiloxane represented by the following average structural formula [I]-2. The molecular weight distribution, Mw/Mn, of polysiloxane [I]-2 was 1.19, as determined by GPC analysis. The average molecular chain length of polysiloxane [I]-2 was longer than that of polysiloxane [II]-1 which was a starting compound, as seen in the following formula [I]-2. This is because the compounds having a shorter chain length moved into the acetonitrile phase and removed and, therefore, the molecular weight distribution of the purified polysiloxane became narrower.

R'Me$_2$SiO(Me$_2$SiO)$_{60}$SiMe$_2$R'      [I]-2

[R': C$_3$H$_6$O(C$_2$H$_4$O)$_8$C)NH(C$_2$H$_4$O)C(=O)C(Me)=CH$_2$]

Comparative Example 1

Synthesis of a Hydrophilic Polysiloxane Macromonomer Having a Polyoxyethylene Group as a Side Chain and Hydrophilic Groups at the Both Terminals (Washed with Methanol and Water)

The procedures of the Example described in Patent Literature 1, i.e. Japanese Patent No. 3441024, were repeated to obtain a hydrophilic polysiloxane macromonomer represented by the average structural formula: R$^1$Me$_2$SiO(Me$_2$SiO)$_{70}$(CF$_3$C$_2$H$_4$MeSiO)$_5$(R$^2$MeSiO)$_3$SiMe$_2$R$^1$, wherein R$^1$ is —C$_3$H$_6$OC$_2$H$_4$OC(=O)NHC$_2$H$_4$OC(=O)C(Me)=CH$_2$ and R$^2$ is —C$_3$H$_6$O(C$_2$H$_4$O)$_7$Me.

Specifically, first, the procedures of Example 7 in Patent Literature 1 were repeated to obtain a compound represented by the average structural formula: HOC$_2$H$_4$OC$_3$H$_6$Me$_2$SiO(Me$_2$SiO)$_{70}$(CF$_3$C$_2$H$_4$MeSiO)$_5$(R$^2$MeSiO)$_3$SiMe$_2$C$_3$H$_6$OC$_2$H$_4$OH, wherein R$^2$ is as defined above.

Then, according to the procedures of Example 1 in Patent Literature 1, the aforesaid compound was reacted with methacryloyloxyethyl isocyanate and, then, the reaction mixture was washed with methanol and water to obtain the aforesaid hydrophilic polysiloxane macromonomer.

The molecular weight distribution, Mw/Mn, of the hydrophilic polysiloxane macromonomer was 1.42, as determined by GPC analysis.

INDUSTRIAL APPLICABILITY

According to the present method, a both-terminal modified polysiloxane macromonomer having high hydrophilicity and a narrow molecular weight distribution is provided. Accordingly, the both-terminal modified polysiloxane macromonomer is useful for preparing ophthalmic devices, such as contact lenses, intraocular lenses and artificial corneas.

The invention claimed is:

1. A method for preparing a both-terminal modified polysiloxane macromonomer represented by the following average structural formula [I]:

RMe$_2$SiO(Me$_2$SiO)$_p$SiMe$_2$R      [I]

wherein R represents —C$_3$H$_6$O(C$_2$H$_4$O)$_q$C(=O)NH(C$_2$H$_4$O)$_s$C(=O)C(Q)=CH$_2$, Me is a methyl group, p is an integer of from 40 to 100, q is an integer of from 5 to 10, s is an integer of from 1 to 3 and Q is a methyl group or a hydrogen atom, wherein the method comprises steps of
(a) reacting a polysiloxane which has polyoxyethylenes at both terminals and is represented by the following average structural formula [II]:

R"Me$_2$SiO(Me$_2$SiO)$_p$SiMe$_2$R"      [II]

wherein R" represents —C$_3$H$_6$O(C$_2$H$_4$O)$_q$H and Me, p and q are as defined above,
with a compound represented by the following general formula [III]:

OCN(C$_2$H$_4$O)$_s$C(=O)C(Q)=CH$_2$      [III]

wherein Q and s are as defined above,
in the presence of a catalyst,
(b) subjecting the mixture obtained in step (a) to liquid-liquid extraction by hexane and acetonitrile, and
(c) removing hexane from a hexane phase to obtain the both-terminal modified polysiloxane macromonomer represented by the average structural formula [I].

2. The method according to claim 1, wherein s is 2 or 3.

3. The method according to claim 1 or 2, wherein each mass of hexane and acetonitrile in the step (b) is one to three times as much as the mass of said reaction mixture.

4. The method according to claim 1, wherein a mass ratio of hexane to acetonitrile in the step (b) is in a range of from 1:3 to 3:1.

5. The method according to claim 1, wherein the both-terminal modified polysiloxane macromonomer has a molecular weight distribution, Mw/Mn, of 1.3 or less.

* * * * *